June 13, 1961  P. L. TUCKER  2,988,190
RETRACTING STRETCH-O-VEYOR
Filed June 29, 1960  3 Sheets-Sheet 1
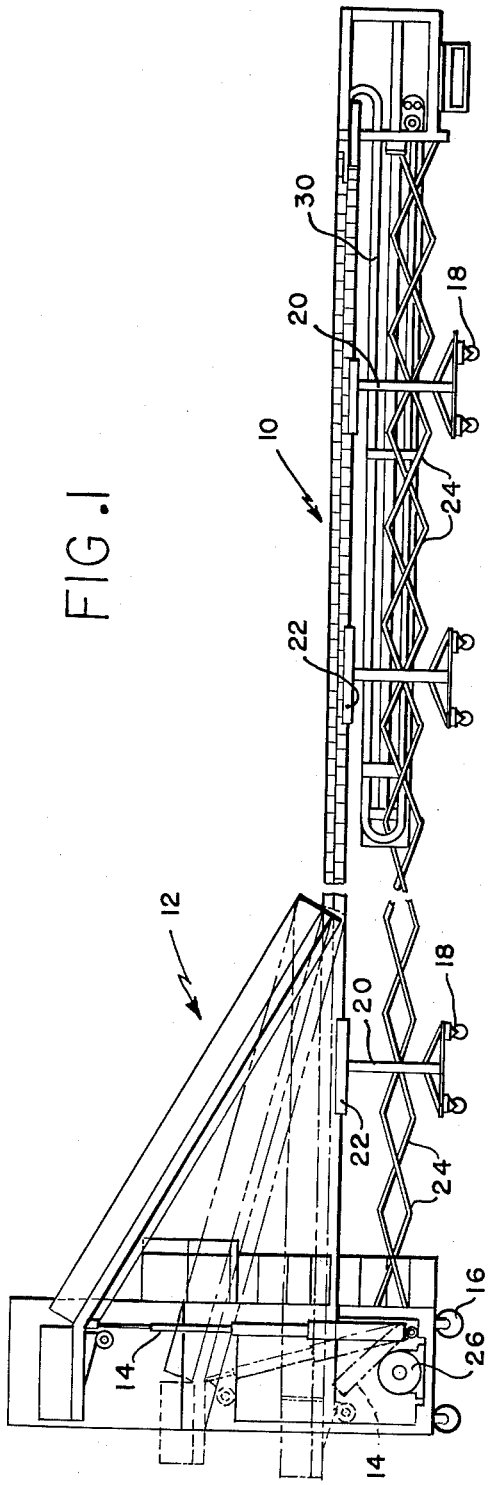
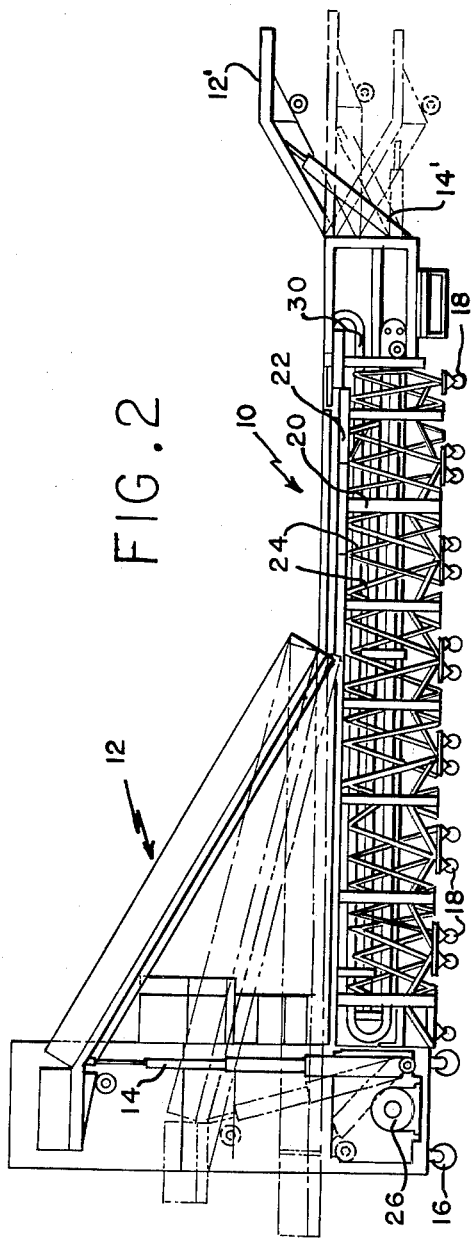
INVENTOR.
PEARL L. TUCKER
BY
ATTORNEYS June 13, 1961 P. L. TUCKER 2,988,190
RETRACTING STRETCH-O-VEYOR
Filed June 29, 1960 3 Sheets-Sheet 2
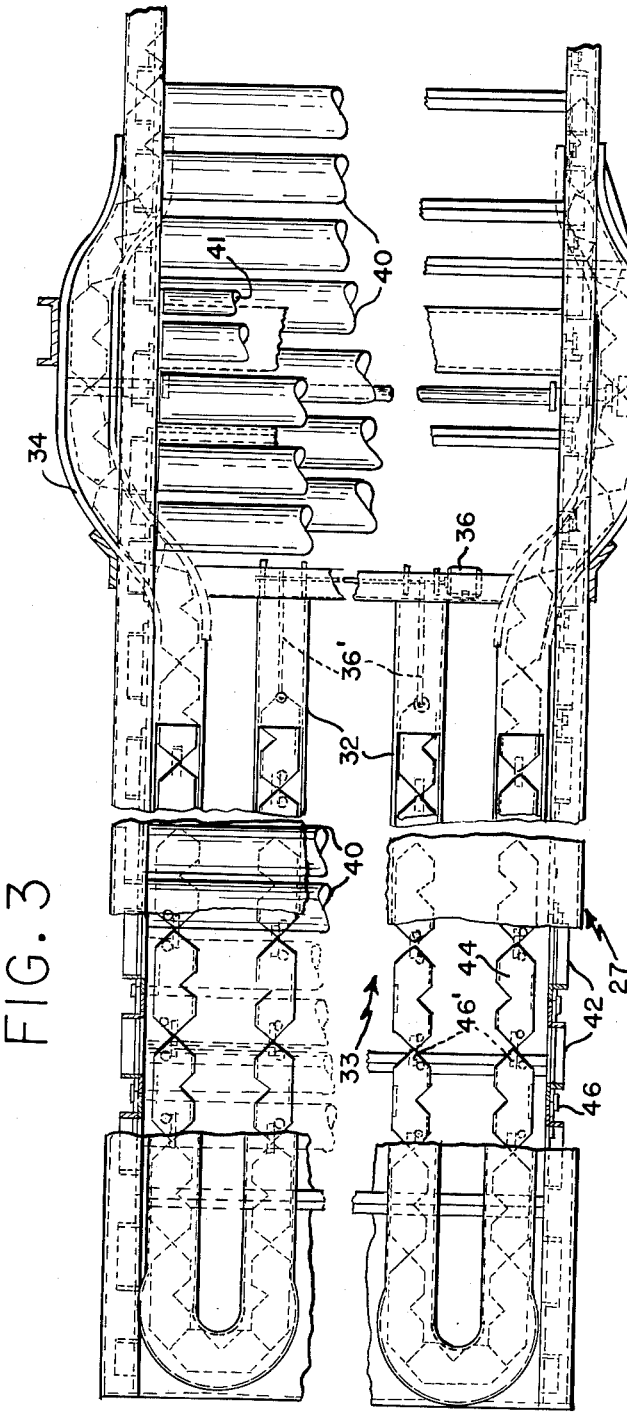
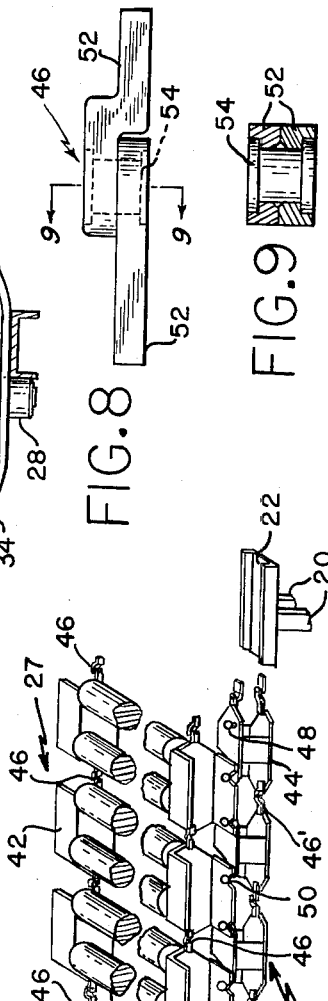
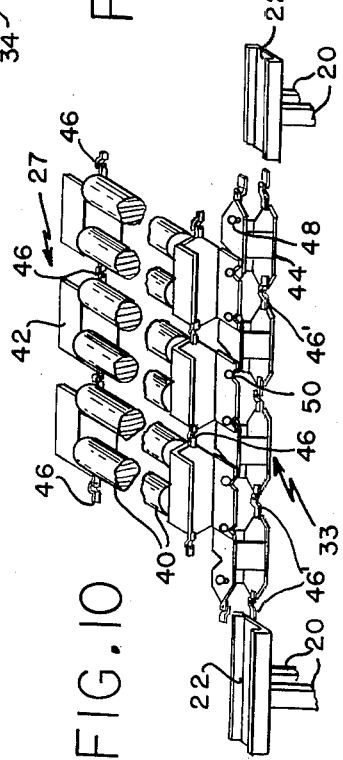
INVENTOR.
PEARL L. TUCKER
BY Wade Koontz and
Sherman H. Goldman
ATTORNEYS June 13, 1961
P. L. TUCKER
2,988,190
RETRACTING STRETCH-O-VEYOR
Filed June 29, 1960
3 Sheets-Sheet 3
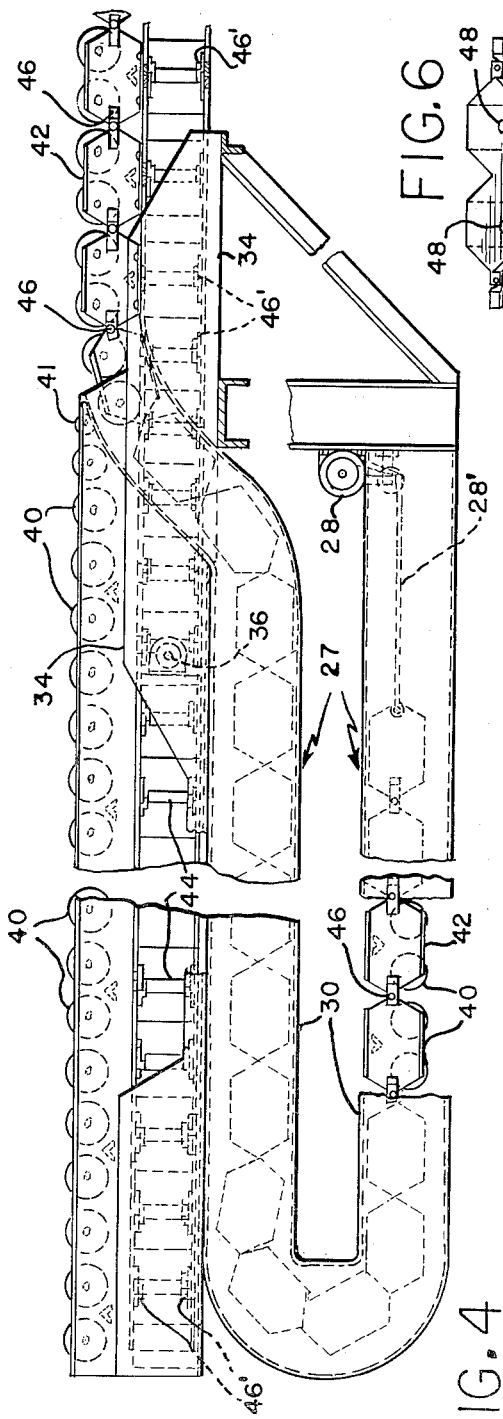
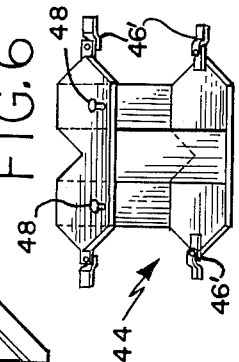
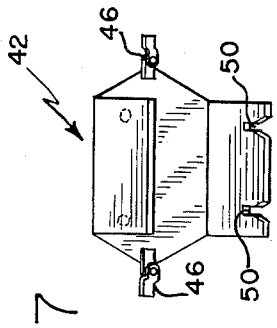
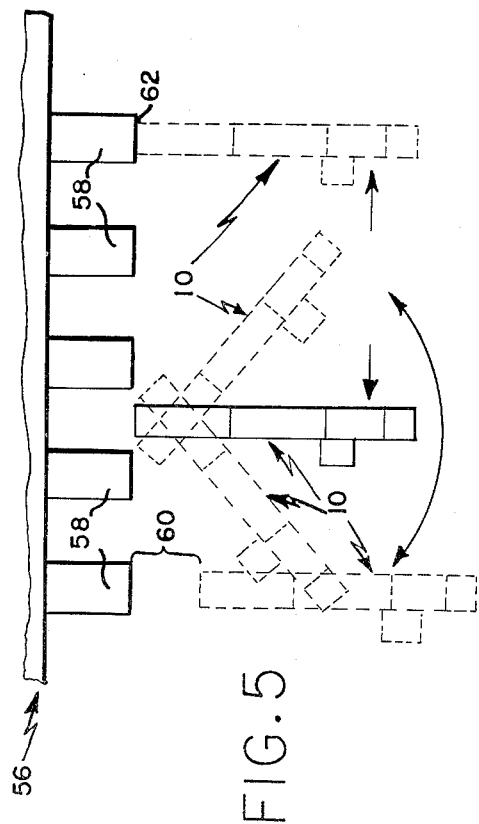
INVENTOR.
PEARL L. TUCKER
BY
ATTORNEYS

United States Patent Office 2,988,190
Patented June 13, 1961

2,988,190
RETRACTING STRETCH-O-VEYOR
Pearl L. Tucker, 4221 NE. 18th St., Oklahoma City, Okla.
Filed June 29, 1960, Ser. No. 39,740
7 Claims. (Cl. 193—35)
(Granted under Title 35, U.S. Code (1952), sec. 266)

The invention described herein may be manufactured and used by or for the United States Government for governmental purposes without payment to me of any royalty thereon.

This invention relates to loading conveyors and, more particularly, to extensible and retractible conveyors for loading or unloading cargo in airplanes or wherever a gate section is required to allow the passage of personnel, vehicles, or fire equipment.

There are many conveyors on the market for loading or unloading freight or cargo from trucks to platforms or vice versa, from ships to warehouses, etc., some having gravity or dead rollers, some having power driven rollers or belts, and some being extensible and contractible. This invention combines all of the foregoing features and has for its object the provision of an efficient, extensible and retractible conveyor system.

It is a further object to provide a contractible conveyor system which can quickly and easily provide a gate through said system to permit the passage of personnel or vehicles.

It is a further object to provide a loading conveyor which may be adapted to dead roller, live roller, or belt systems.

It is also an object to provide a loading system which may have long extensible and retractible sections particularly adapted to loading and unloading airplanes.

Briefly, this invention comprises a pair of conveyor supporting chains, the upper chain carrying rollers and being hinged by pivots in a horizontal plane to permit flexing or bending of the chain in a vertical plane, while the other, or lower chain, is hinged by pivots in a vertical plane to permit flexing or bending of the chain in a horizontal plane. Pins in the lower chain are detachably connected in slots in the roller-carrying chain so that when the two are connected they form a stiff supporting structure which cannot be bent to the right or left or up or down. When the pins in the lower chain are disconnected from the slots in the upper, or roller chain, said roller chain is free to move on its horizontal pivots in a vertical plane and can be folded back on itself or stored. The lower chain, when disconnected, is free to move on its vertical pivots in a horizontal plane and can be folded on itself or stored.

The above and still other objects, advantages and features of my invention will become apparent upon consideration of the following detailed description of one embodiment thereof, especially when taken in conjunction with the accompanying drawings, in which:

FIGURE 1 is a side view of a section of the conveyor shown in the expanded position;

FIGURE 2 is a side view showing a section of the conveyor in the contracted position;

FIGURE 3 is a top view looking down and showing the track or channel for disengaging the upper chain from the lower and for storing the lower chain;

FIGURE 4 is a side view showing the upper chain being disengaged from the lower chain and the upper chain being stored in a track or channel.

FIGURE 5 is a diagrammatic drawing showing how the invention may be moved at an angle to accommodate any loading condition and how the section can be contracted to make a gate for passage of vehicles;

FIGURE 6 is an isometric view of a link in the lower or support chain;

FIGURE 7 is an isometric drawing of one link of the upper, or roller-carrying chain;

FIGURE 8 is a sectional view of the hinge used to connect the links in the chains;

FIGURE 9 is a sectional view of the hinge taken along lines 9—9 of FIGURE 8; and FIGURE 10 is an isometric drawing showing the connection of the upper and lower chains.

In the drawings, the numeral 10 designates a section of the conveyor, in FIGURE 1 shown extended and in FIGURE 2, contracted. A ramp 12, which can be adjusted to any suitable height by hydraulic cylinder 14, is shown supported on drive wheels 16 connected by a suitable reduction gear to motor 26. The drive wheels 16, when turned by motor 26, are capable of moving the conveyor forward or backward, or at an angle.

In FIGURES 1 and 2, casters 18 may be seen supporting the conveyor through posts 20 which in turn support channel frame supports 22.

FIGURE 10 best shows how a pair of roller chains 27, one on each side of the conveyor, and carrying rollers 40, mesh with support chains 33 through slots 50 in said roller chains fitting under pins 48 in the said support chains. Since the pivots 54 of hinge 46 joining the links 42 of the roller chains 27 are in a horizontal plane, it is seen that said roller chains are prevented from moving in a horizontal direction but are free to move on said pivots in a vertical plane. Since the pivots 54 in the said support chains are in a vertical plane in the hinges 46' which connect the individual links 44 in the support chain, it is prevented from moving up or down but is free to move in a horizontal direction. When the two sets of chains are interlocked, or meshed, by the engagement of the pins 48 of the support chains 33 with the slots 50 of the roller chains 27, the two sets of chains form a fairly rigid support which is capable of carrying a load between channel frame supports 22 when the latter are separated by extension of the conveyor. Separation of the said support channels 22, when a section is extended, is best seen in FIGURE 1.

In operation, assume the conveyor is extended as in FIGURE 1 and it is desired to retract it. Refer to FIGURES 3 and 4. Motors 28 and 36 are connected through suitable reduction gears to drums (not shown), to which retracting cables 28' and 36' are attached. The other ends of said cables are attached to chains 27 and 33 respectively and when the said motors are started simultaneously the said chains are retracted and stored in storage channels 30 and 32. This action effectively shortens the conveyor, drawing the channel frame supports 22 together which are free to roll on casters 18. If the contraction of the section is meant to merely shorten the conveyor, the ramp section 12, free to move on the wheels 16, would be pulled along with the contracting section while the ramp section 12' would remain fastened by suitable means to a permanent section or a platform, such as 58, in FIG. 5. If a gate for passage of personnel or vehicles is desired it is merely necessary to unfasten ramp 12' from the platform 58, or a permanent section of the conveyor, and a passage could be quickly provided as at 60 in FIG. 5. To extend the conveyor the adjustable ramp 12' would remain fastened and the motor 26 in adjustable ramp 12 would be started and through suitable reduction gear (not shown), would drive the wheels 16, thus stretching the conveyor and causing the two sets of chains to leave their storage channels 30 and 32 and join, or mesh, in channel 34 at 34'. Once meshed the two pairs of chains form a stiff load bearing surface with rollers 40 on top. Lazy tongs 24 would be extended to stiffen the structure and keep the distance between frame supports 22 uniform.

In FIG. 5 a section of the conveyor 10 is shown attached at 62 to a loading platform 58 which is one of any number of such platforms as part of warehouse 56. As previously pointed out a gate, or passage, is shown at 60 to allow passage of vehicles or personnel and at the center of the figure a section is shown ready for attachment at several angles to the said platforms.

If live rollers are required, or a belt system, additional motors and drive mechanisms can be added by employing conventional means.

As can be seen this conveyor is very useful in loading large cargo planes which have a wing spread of over a hundred feet. Whether a loading or unloading plane is backed up toward a platform or run alongside of it, it will take a long conveyor to reach the loading door of the plane and since planes vary in size a retractible and extensible conveyor is a necessity. The conveyor represented in FIGS. 1 and 2 was designed to extend from 38 feet retracted to 86 feet extended.

It is to be understood that the above arrangement is merely illustrative of the applications of the principles of the invention and that numerous other embodiments may be devised by those skilled in the art without departing from the spirit and the scope of the invention.

What is claimed is:

1. An extensible and contractible conveyor comprising a frame free to move on casters and supporting a series of channels carrying two pairs of chains having links, said two pairs of chains comprising an upper chain carrying rollers, a lower chain supporting said upper chain, means for interlocking said upper and lower pairs of chains to form a stiff supporting member, means for guiding said pairs of chains into locking position, means for retracting said chains and means for storing said chains under said frame.

2. An extensible and contractible conveyor as described in claim 1 wherein the means for interlocking said pairs of chains comprises a slot in a link of the said upper chain engaging a pin in a corresponding link in said lower chain.

3. An extensible and contractible conveyor as described in claim 1 wherein the upper pair of chains carrying rollers comprises links pivoted in a vertical plane and the lower supporting chain comprises links pivoted in a horizontal plane.

4. An extensible and contractible conveyor as described in claim 1 wherein the means for guiding said pairs of chains into locking position comprises a first pair of channels for storing said lower chains, said first pair of channels being displaced outwardly near said locking point to allow said lower pair of chains to laterally engage said upper pair of chains, and a second pair of channels for storing said upper pair of chains, said second pair of channels operating to guide said upper pair of chains into position for engagement with said lower pair of chains.

5. An extensible and contractible conveyor as described in claim 1 wherein the means for retracting said chains comprises motor driven drums, a cable attached to each of said drums, said chains being attached to the other end of said cables.

6. An extensible and retractible conveyor as described in claim 1 wherein the means for storing said chains comprises suitable channels disposed under the said frame.

7. An extensible and retractible conveyor as described in claim 1 wherein there is a means for extending said conveyor comprising a motor geared to wheels disposed under one end of said frame, said motor operating to drive said wheels to move said frame.

No references cited.